United States Patent Office 3,477,346
Patented Nov. 11, 1969

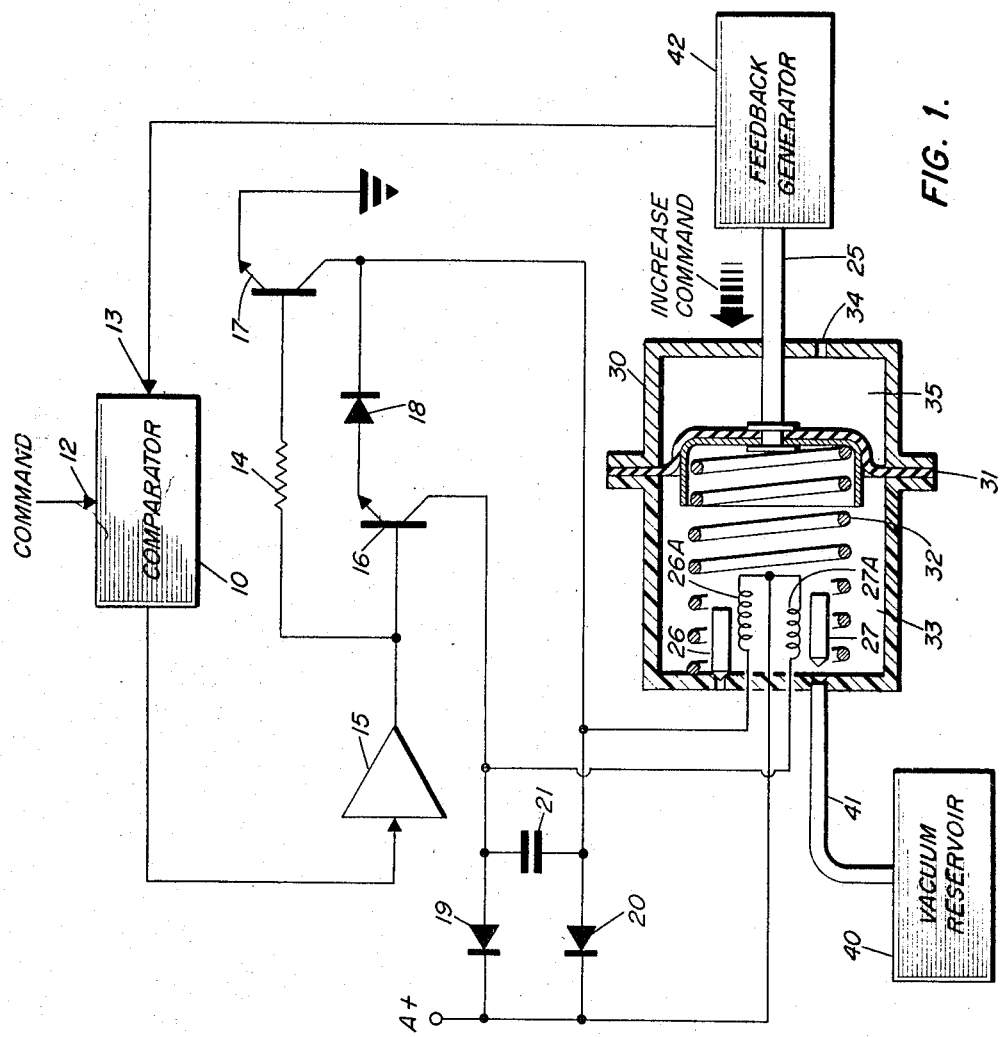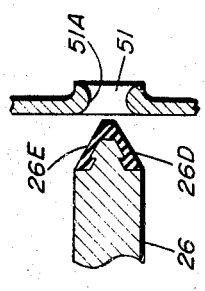

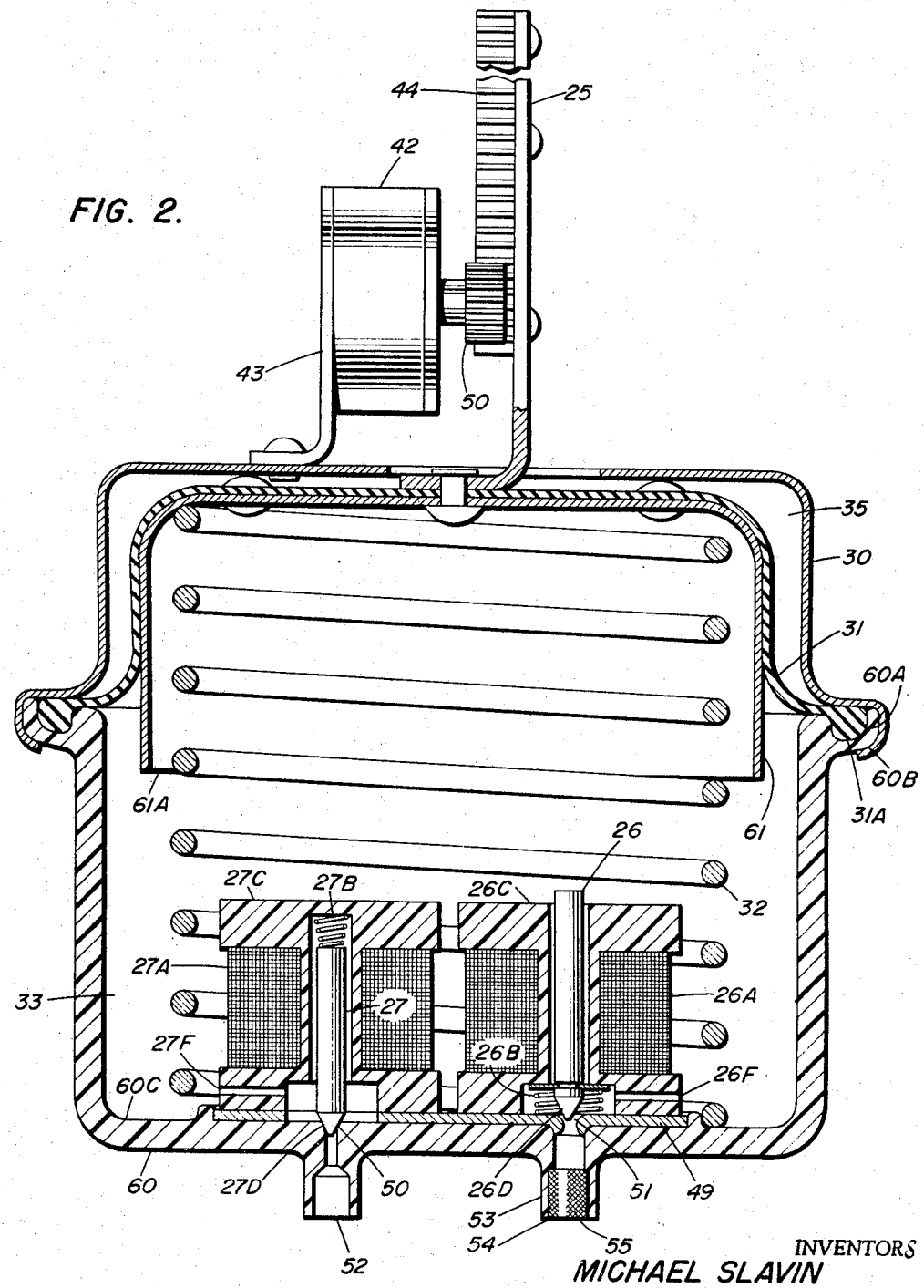

3,477,346
INTEGRATED VACUUM MODULATOR AND ACTUATOR
Michael Slavin, Raymen F. Emery, and Ralph W. Carp, Baltimore, Md., assignors to The Bendix Corporation, a corporation of Delaware
Filed Oct. 24, 1967, Ser. No. 677,705
Int. Cl. F15b 13/16, 11/10; F16j 3/00
U.S. Cl. 91—361                                                                   18 Claims

ABSTRACT OF THE DISCLOSURE

An integrated vacuum modulator and actuator for use in a vacuum actuated, electromechanical servo loop in which a hermetically sealed chamber has as one side a collapsible spring loaded diaphragm which is positioned in response to the pressure differential across it. Two solenoid valves are located within the hermetically sealed chamber. One valve, which is normally opened, allows communication between the chamber and atmospheric air. The other valve which is normally closed connects the chamber to a vacuum source when open. Power is applied to one end of each solenoid winding, while the other ends are connected to ground through an error signal controlled logic circuit. Upon increasing error signal, the normally open valve will close before the normally closed valve opens. A potentiometer is driven by the diaphragm connected rod so as to generate a servo loop feedback signal correlative to rod position.

Cross references to related applications

The vacuum modulator and actuator disclosed herein is similarly disclosed in a patent application for "Automobile Speed Control," Ser. No. 677,697, filed Oct. 24, 1967 by Carp et al. and which is owned by the same assignee.

Background of the invention

Vacuum actuators are known which utilize a hermetically enclosed chamber sealed in part by a spring loaded flexible diaphragm connected usually through a rod to some mechanically positioned control so as to operate the control in response to vacuum (negative gage pressure) variations within the hermetically sealed chamber.

A vacuum modulator for modulating the vacuum within the hermetic chamber of the actuator in response to an electrical signal has been shown in U.S. Patent No. 3,315,-730, "Control System for Automobile Air Conditioners" by R. D. Weaver et al. This vacuum modulator includes within a hermetically sealed chamber a pair of opposed, spring loaded needle valves captured by a floating bobbin on which is wound a center tapped coil. The coil is immersed in the radial field of a ring magnet which forms part of the modulator chamber wall. Equal currents through opposite halves of the coil winding exert oppositely directed forces upon the bobbin, tending to equalize its position vertically within the magnetic field. An unbalance in the differential currents of opposite halves of the coil winding resulting from a difference in voltages at the coil ends results in an increase of force above the quiescent force for one-half the winding and an equal decrease in force below the quiescent force for the other half of the winding.

The aforementioned pair of opposed valves normally seat in their respective vents, one of which communicates with atmospheric air, while the other communicates with a source of negative pressure. Additionally, the interior of the vacuum modulator communicates directly through a length of vacuum tubing with the interior of the hermetically sealed chamber of the vacuum actuator. In this manner, the pressure attained in the vacuum modulator is communicated to the vacuum actuator. In the normal condition, equal opposed currents flow in the winding so that the bobbin is centered and both valves seated, thereby sealing the interior of the vacuum modulator and vacuum actuator from outside pressures. When currents in opposite halves of the coil winding become unbalanced, the bobbin moves from its equilibrium position in the direction of the coil half carrying the greater current so as to unseat one of the valves while maintaining the other valve closed, thereby either raising or lowering the pressure within the modulator and the actuator. The actuator diaphragm and attached rod are repositioned in accordance with the changed pressure. If the changed position of the rod is used to generate an electrical feedback signal in response thereto which is compared in a comparator to a desired rod position to generate the error signal to be applied to the vacuum modulator, it can be seen that by proper choice of system parameters, this vacuum modulator can be used, in a vacuum actuated electromechanical servo system, as the transducer between the electrical and vacuum portions of the system.

There has been an increased acceptance of electromechanical vacuum actuated servo systems in automobiles for automatically controlling the various parameters associated with automobile operation such as speed, passenger compartment air temperature, door locking at a predetermined vehicle speed, etc. The presence of engine manifold vacuum makes vacuum actuation in the servo loop particularly attractive. The ring magnet sued in present vacuum modulators, however, has necessitated a heavy, bulky and expensive modulator which presented assembly problems due to the magnetizing of other modulator parts by the magnet resulting in sticking parts which are difficult to align with respect to one another.

Summary of the invention

Accordingly, a new vacuum modulator has been devised for use in a servo loop to produce a vacuum level responsive to an electrical signal. Two solenoid valves are used, one normally closed for controlling communication of the modulator interior with a source of vacuum, and the other normally open for controlling communication of the modulator interior with atmospheric air. One end of each solenoid coil winding is tied to a power source, while the other ends are tied to ground through an error signal controlled logic circuit in such a manner that as the error signal increases, the normally open valve closes, trapping within the modulator the then acquired pressure. As the error signal increases further, the normally closed valve opens, allowing communication between the modulator and the vacuum source. With a decreasing error signal, the reverse action occurs: the normally closed valve closes before the normally opened valve opens.

By coating the tips of the valves with a thin coating of a rubbery material, a resilient, leak tight seal between the valve and its seat can be obtained while still holding the magnetic circuit gap to a minimum. Additionally, by shaping the valve seat in a proper manner, the withdrawal force required to open a valve is greatly decreased. These smaller required actuating forces and larger obtainable magnetic forces have allowed miniaturization of the valve to such an extent that the valves can be conveniently combined within the hermetically sealed chamber beneath the vacuum actuator diaphragm so as to make, in effect, the hermetically sealed chamber of the actuator and the modulator a common chamber thereby effecting a great volume saving.

Brief description of the drawings

FIG. 1 is a functional block diagram of a servo system using the integrated vacuum modulator and actuator of the invention.

FIG. 2 is a detailed view of an integrated vacuum modulator and actuator of the invention; and, FIG. 3 is an enlarged view of a valve constructed in accordance with the teachings of the invention.

Description of the preferred embodiment

Referring to FIG. 1, a comparator 10, compares a command signal 12, in the form of an electrical signal indicating a desired position of rod 25, to generate an error signal. A driver 15 amplifies the error signal and applies the amplified error signal directly to the base of transistor 16 and throught resistor 14 to the base of transistor 17. Resistor 14 prevents the error signal from clamping of the base voltage of transistor 17. The common ends of solenoid valve windings 26A and 27A are connected to a source of A+ power. The other end of winding 27A is connected to the collector of transistor 16 while the other end of winding 26A is connected to the collector of transistor 17, whose emitter is grounded. Additionally, transistor 16 emitter is connected through diode 18 to transistor 17 collector. Transistors 16 and 17 and diode 18 comprise a logic circuit controlled by the amplified error signal. It will be noted that diode 18 is back biased by the A+ power source whenever transistor 17 is turned off, thereby also back biasing transistor 16. Transistor 16 will be conductive only when transistor 17 is conductive and its base voltage exceeds its diode forward voltage drop and the forward voltage drop of diode 18. Driver 15 is so designed that when command signal 12 equals feedback signal 13, the amplified error signal will be sufficient to cause transistor 17 to conduct, thereby energizing winding 26A to close valve 26, while transistor 16 and hence winding 27A will remain unenergized.

An integrated vacuum modulator and actuator 30 includes diaphragm 31, biased to the right by spring 32, which defines one side of chamber 35 which communicates freely through port 34 with atmospheric air.

Assuming, now, that an increased command signal will cause rod 25 to move to the left and that such a command signal is impressed on comparator 10. The amplified error signal is large enough to cause transistors 16 and 17 to conduct thereby energizing solenoid valves 26 and 27 so that valve 26 closes and isolates chamber 33 from the atmosphere and then valve 27 opens allowing communication from chamber 33 to vacuum reservoir 40 through vacuum tubing 41. The decreased pressure in chamber 33 will allow the atmospheric pressure in chamber 35 to force diaphragm 31 and attached rod 25 to the left, thereby compressing spring 32. As rod 25 moves to the left, the feedback signal 13 generated by feedback generator 42 decreases until it is equal to the new command signal. Under these conditions, the amplified error signal, as previously discussed, is insufficient to maintain transistor 17 conductive so that valve 26 remains closed. Chamber 33 is now hermetically sealed at an equilibrium point where the force exerted by spring 32 and the pressure in chamber 33 is equal to force exerted by the atmosphere on diaphragm 35. Additionally, the feedback signal equals the command signal.

Diodes 19 and 20 and capacitor 21 are provided to suppress the voltage spikes generated when circuits of this type are switched.

Referring to FIG. 2, spring 26B biases valve 26 out of vent 51 formed in ferromagnetic plate 49. FIG. 3 shows that valve 26 which is also ferromagnetic material terminates in barbed end 26E on which is bonded a resilient cone shaped tip 26D which, when the valve is closed, provides a leak tight seal of vent 51. A coating of .008 to .010 inch rubber having a durometer reading of 70 has been found to have excellent sealing and wearing ability. Additionally, the short gap in the magnetic circuit, between ferromagnetic valve 26 and ferromagnetic plate 49 results in a valve which closes readily and tightly in the presence of a magnetic field induced by the energizing of winding 26A. To prevent binding of valve 26 in vent 51, the valve seating surfaces of the vent have been finished in a rounded, roughly spherical shape so as to allow minimum contact between valve tip 26D and vent 51. When valve 26 is open, the chamber 33 is exposed to atmospheric air through housing extension 53 having a cavity 54 containing air filter 55.

Valve 27 also has a barbed end and resilient tip similar to that of valve 26. Valve seat 50, however, is formed in non-magnetic housing 60 so that there is a large gap in the magnetic circuit which would otherwise tend to keep valve 27 closed when winding 27A is energized. Valve 27, therefore, opens readily in response to the energizing of winding 27A.

An extension 52 of housing 60 is shaped to allow vacuum tubing to be attached thereto, the other end of the tubing being attached to a vacuum source. Winding 27A is wound on bobbin 27C which additionally has a hole 27F allowing air in chamber 33 to flow therethrough when valve 27 is open. Similarly, winding 26A is wound on bobbin 26C which also has a hole 26F allowing atmospheric air to enter chamber 33 when valve 26 is open.

As previously explained, housing 60 is made of a moldable non-magnetic material, preferably one of the family of structural plastic materials. An annular groove 60A in housing 60 seats annular protuberance 31A of diaphragm 31. Housing 30, which is a formable metallic material, is rolled over housing ring 60B, thereby sandwiching diaphragm 31 between housing 30 and 60 and forming an air tight seal between chambers 33 and 35.

A cup-shaped rigid piece 61 is fastened to diaphragm 31 to reinforce it and cause it to retain its shape as vacuum is drawn in chamber 33. Additionally, as the diaphragm moves into chamber 33, edge 61A abuts housing surface 60C thereby providing a limit stop to the travel of the diaphragm.

Rod 25 is fastened to diaphragm 31 and cup-shaped piece 61 so as to extend through housing 30. A potentiometer 42 is fastened through bracket 43 to housing 30. A pinion 50 on the potentiometer shaft is driven by a rack 44 fastened to rod 25. If a voltage is impressed across the potentiometer winding, the slider voltage constitutes a voltage response to diaphragm and rod position and can be used as the aforementioned feedback signal.

The invention claimed is:

1. An integrated vacuum modulator and actuator for use in a vacuum actuated electromechanical servo system comprising:
   a flexible diaphragm;
   a hermetic housing having first and second channels extending through said housing to the exterior thereof and having one side defined by said flexible diaphragm, the volume enclosed by said housing including said diaphragm comprising an expansible chamber;
   a helically wound spring biasing said diaphragm to normally expand said chamber;
   a first solenoid valve having a winding and a valve seat located within said chamber for sealing said first channel; and,
   a second solenoid valve having a winding and a valve seat located within said chamber for sealing said second channel, said first and second solenoid valves being located within the helix of said spring.

2. An integrated vacuum modulator and actuator as recited in claim 1 wherein said first solenoid valve is normally open and said second solenoid valve is normally closed.

3. An integrated vacuum modulator and actuator as recited in claim 1 wherein said servo system includes means for generating a servo system error signal and with additionally:
   a first power terminal connected to one end of each said solenoid winding;
   a second power terminal; and, logic circuitry responsive to said servo system error signal for electrically connecting the other ends of said solenoid windings together and for connecting said connected other ends to said second power terminal.

4. An integrated vacuum modulator and actuator as recited in claim 3 wherein said logic circuitry comprises:
- a first transistor having a base circuit connected to receive said error signal and a collector-emitter circuit connected between said second power terminal and said first solenoid winding;
- a second transistor having a base circuit connected to receive said error signal and a collector-emitter circuit connected serially with said second solenoid winding; and,
- a diode connected between the collector-emitter circuit of said first transistor and the collector-emitter circuit of said second transistor to complete an electrical path through said second solenoid winding comprising said first power terminal, said second solenoid winding, said second transistor collector-emitter circuit, said diode, said first transistor collector-emitter circuit and said second power terminal.

5. An integrated vacuum modulator and actuator as recited in claim 2 wherein said first solenoid valve seat comprises a magnetic material and said second solenoid valve seat comprises a non-magnetic material.

6. An integrated vacuum modulator and actuator as recited in claim 1 with additionally a rigid cup-shaped piece interposed between said spring and said diaphragm, the walls of said cup extending away from said diaphragm.

7. An integrated vacuum modulator and actuator as recited in claim 6 wherein said cup-shaped piece approximately defines the minimum volume of said expansible chamber.

8. An integrated vacuum modulator and actuator as recited in claim 1 wherein at least said first valve comprises a magnetizable tapered tip having a relatively thin resilient coat, for mating with said first valve seat.

9. An integrated vacuum modulator and actuator as recited in claim 1 with additionally:
- a linkage attached to said diaphragm exterior of said chamber and responsive to the position of said diaphragm.

10. A vacuum modulator and actuator for use in a vacuum actuated electromechanical servo system comprising:
- a flexible diaphragm;
- a hermetic housing having first and second channels extending through said housing to the exterior thereof and having one side defined by said flexible diaphragm, the volume enclosed by said housing and said diaphragm comprising an expansible chamber;
- a spring biasing said diaphragm to normally expand said chamber;
- a first solenoid valve having a winding and a magnetic valve seat located within said chamber for sealing said first channel; and,
- a second solenoid valve having a winding and a non-magnetic valve seat located within said chamber for sealing said second channel.

11. An integrated vacuum modulator and actuator as recited in claim 10 wherein said first solenoid valve is normally open and said second solenoid valve is normally closed.

12. An integrated vacuum modulator and actuator as recited in claim 10 wherein said servo system includes means for generating a servo system error signal and with additionally:
- a first power terminal connected to one end of each said solenoid winding;
- a second power terminal; and,
- logic circuitry responsive to said servo system error signal for electrically connecting the other ends of said solenoid windings together and for connecting said connected other ends to said second power terminal.

13. An integrated vacuum modulator and actuator as recited in claim 12 wherein said logic circuitry comprises:
- a first transistor having a base circuit connected to receive said error signal and a collector-emitter circuit connected between said second power terminal and said first solenoid winding;
- a second transistor having a base circuit connected to receive said error signal and a collector-emitter circuit connected serially with said second solenoid winding; and,
- a diode connected between the collector-emitter circuit of said first transistor and the collector-emitter circuit of said second transistor to complete an electrical path through said second solenoid winding comprising said first power terminal, said second solenoid winding, said second transistor collector-emitter circuit, said diode, said first transistor collector-emitter circuit and said second power terminal.

14. An integrated vacuum modulator and actuator as recited in claim 10 wherein said biasing spring is helically wound and said first and second solenoid valves are located within the helix of said spring.

15. An integrated vacuum modulator and actuator as recited in claim 14 with additionally a rigid cup-shaped piece interposed between said spring and said diaphragm, the walls of said cup extending away from said diaphragm.

16. An integrated vacuum modulator and actuator as recited in claim 15 wherein said cup-shaped piece approximately defines the minimum volume of said expansible chamber.

17. An integrated vacuum modulator and actuator as recited in claim 10 wherein at least said first valve comprises a magnetizable tapered tip having a relatively thin resilient coat, for mating with said first valve seat.

18. An integrated vacuum modulator and actuator as recited in claim 10 with additionally:
- a linkage attached to said diaphragm exterior of said chamber and responsive to the position of said diaphragm.

References Cited

UNITED STATES PATENTS

| | | | |
|---|---|---|---|
| 1,878,822 | 9/1932 | Dewandre | 91—454 |
| 2,107,110 | 2/1938 | Eaton et al. | 91—457 |
| 2,566,708 | 9/1951 | Trevaskis | 91—454 |
| 2,808,705 | 10/1957 | Ingres | 91—457 |

PAUL E. MASLOUSKY, Primary Examiner

U.S. Cl. X.R.

91—457; 92—94, 99